United States Patent [19]

Felder-Schraner, deceased et al.

[11] 4,431,774
[45] Feb. 14, 1984

[54] PROCESS FOR THE CURING OF STOVING LACQUERS

[75] Inventors: Louis Felder-Schraner, deceased, late of Basel, Switzerland, by Rita Gertrud Felder-Schraner, Marcel Charles Felder, heirs; Godwin Berner, Rheinfelden; Rudolf Kirchmayr, Aesch, both of Switzerland

[73] Assignee: Ciba-Geigy Corporation, Ardsley, N.Y.

[21] Appl. No.: 414,278

[22] Filed: Sep. 3, 1982

[30] Foreign Application Priority Data

Sep. 14, 1981 [CH] Switzerland ............... 5925/81

[51] Int. Cl.³ ............... C08L 61/28; C08F 2/50
[52] U.S. Cl. ............... 525/162; 204/159.21; 204/159.24; 525/176; 525/348; 525/437; 525/443; 525/453; 525/480; 525/509; 525/523
[58] Field of Search ............... 525/162, 176, 348, 437, 525/443, 453, 480, 509, 523; 204/159.21, 159.24, 159.16, 159.19

[56] References Cited

U.S. PATENT DOCUMENTS 3,474,054 10/1969 White et al. ............... 260/15
4,200,729 4/1980 Calbo ............... 525/398

OTHER PUBLICATIONS

Marvel et al., J. Am. Chem. Soc. 51, 3638–3641 (1929).

Primary Examiner—Theodore E. Pertilla

Attorney, Agent, or Firm—Harry Falber

[57] ABSTRACT

Quinolinium sulfonates of the formula I

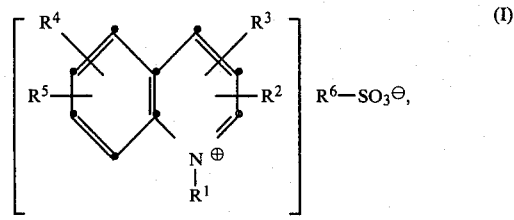

wherein $R^1$ is $C_1$–$C_8$-alkyl, $C_1$–$C_4$-alkyl substituted by halogen, hydroxyl or $C_1$–$C_4$-alkoxy, or it is $C_2$–$C_8$-alkenyl, $C_7$–$C_9$-phenylalkyl or $C_5$–$C_8$-cycloalkyl, $R^2$, $R^3$, $R^4$ and $R^5$ independently of one another are each hydrogen, $C_1$–$C_4$-alkyl, halogen, —CN, —COO($C_1$–$C_4$-alkyl), —CHO, hydroxyl, $C_1$–$C_4$-alkoxy, an acyloxy group $R^7$COO—, a group $R^8$—CH=CH—, $C_7$–$C_9$-phenylalkyl or phenyl, $R^6$ is $C_1$–$C_{12}$-alkyl, $C_6$–$C_{10}$-aryl which is unsubstituted or mono- or polysubstituted by $C_1$–$C_{12}$-alkyl, $C_1$–$C_4$-alkoxy, halogen or a group $R^7$CONH—, or it is fluorine, $NH_2$ or $CF_3$, and $R^7$ and $R^8$ independently of one another are each $C_1$–$C_4$-alkyl or phenyl, are suitable as latent curing catalysts for acid-curable stoving lacquers. There is formed by irradiation with UV light the actual acid catalyst, which renders possible curing at relatively low stoving temperatures.

9 Claims, No Drawings

PROCESS FOR THE CURING OF STOVING LACQUERS

The invention relates to a process for the curing of acid-curable stoving lacquers by the use of quinolinium sulfonates as curing catalysts, which decompose on being exposed to shortwave light to form free sulfonic acid.

Stoving lacquers are lacquers which can be cured by heat treatment. They are based on binders which are able on being heated to undergo crosslinking reactions. Binders of this type are for example acrylic, polyester, alkyd, phenolic, melamine, urea, epoxide or polyurethane resins. There are used in most cases mixtures of two different resins, for example a mixture of a polyester resin and a melamine resin. The reactive groups capable of crosslinking can be of varying nature, for example they can be N-methylol groups, epoxide groups or methylol ether groups. Although the chemical curing mechanism of these resins differs, they have in common that the curing of them can be accelerated by acid catalysts. The advantage of the addition of curing catalysts is the shortening of the curing times necessary, or the lowering of the curing temperatures required. The disadvantage of the catalyst addition is however the resulting decrease of storage stability, since in the presence of these catalysts there occurs a slow crosslinking even at room temperature. The acid catalyst cannot therefore be added to the lacquer until shortly before application, and the lacquer catalysed in this way has to be applied within a specific pot life period. Single-component systems containing an acid catalyst are therefore not possible. Curing catalysts are for this reason only used in special cases, for example in automobile repair lacquers, or for the lacquering of plastics articles, where stoving at high temperatures is impossible.

The acid catalysts used in these cases are difficultly volatile acids, for example phosphoric acid, aromatic sulfonic acids or maleic acid half-esters. It has also been already suggested that instead of using the free acids, the salts thereof with organic amines be used. For example, the U.S. Patent Specification No. 3,474,054 suggests using, as curing catalysts, pyridine salts of p-toluenesulfonic acid, and the German Offenlegungsschrift No. 2,920,306 oxazolidine salts of aromatic sulfonic acids. Salts of this kind are approximately neutral at room temperature; on heating they split off the volatile amine, the non-volatile acid remaining in the lacquer and effecting there a rapid curing. These salts can therefore be described as being latent curing catalysts. According to this principle however, there always has to be a sufficient temperature difference between storage temperature and curing temperature. At the storage temperature, the rate of decomposition of the salt has to be infinitely low, and at the curing temperature very high. When there is required however a lacquer system which is fully satisfactorily storage-stable up to 60° C., but which rapidly cures already at 70° to 80° C., such a system is essentially not realisable with the use of thermally cleavable, latent curing catalysts.

It has been found that a system of the aforementioned type is however realisable when there is used a latent curing catalyst which is cleavable by exposure to shortwave light. Latent curing catalysts suitable for this purpose are specific quinolinium sulfonates. Lacquers which contain a catalyst of this type are storage-stable in the dark up to 60° C. If before stoving they are irradiated for a short time with UV light, the lacquers can be cured already at temperatures above 70° C. in the commercially customary curing times.

The present invention relates therefore to a process for curing acid-catalysable stoving lacquers by heating in the presence of a latent curing catalyst, which process comprises using, as curing catalyst, a quinolinium sulfonate of the formula I

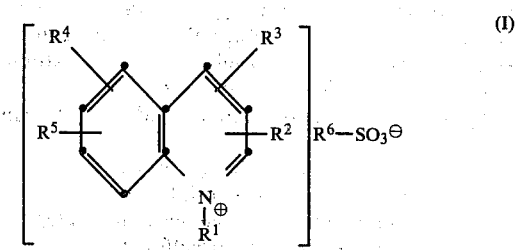

wherein $R^1$ is $C_1$-$C_8$-alkyl, $C_1$-$C_4$-alkyl substituted by halogen, hydroxyl or $C_1$-$C_4$-alkoxy, or it is $C_2$-$C_8$-alkenyl, $C_7$-$C_9$-phenylalkyl or $C_5$-$C_8$-cycloalkyl, $R^2$, $R^3$, $R^4$ and $R^5$ independently of one another are each hydrogen, $C_1$-$C_4$-alkyl, halogen, -CN, -COO($C_1$-$C_4$-alkyl), -CHO, hydroxyl, $C_1$-$C_4$-alkoxy, an acyloxy group $R^7$COO-, a group $R^8$-CH=CH-, $C_7$-$C_9$-phenylalkyl or phenyl, $R^6$ is $C_1$-$C_{12}$-alkyl, $C_6$-$C_{10}$-aryl which is unsubstituted or mono- or polysubstituted by $C_1$-$C_{12}$-alkyl, $C_1$-$C_4$-alkoxy, halogen or a group $R^7$CONH-, or it is fluorine, $NH_2$ or $CF_3$, and $R^7$ and $R^8$ independently of one another are each $C_1$-$C_4$-alkyl or phenyl; and irradiating the lacquer with shortwave light before heating.

When one of the substituents $R^1$ to $R^8$ in the formula I is alkyl, is can be a straight-chain or branched-chain alkyl group. Examples thereof, within the limits of the defined number of C atoms, are: methyl, ethyl, propyl, isopropyl, n-butyl, iso-butyl, sec-butyl, tert-butyl, hexyl, octyl, isooctyl, 2-ethylhexyl, decyl or dodecyl. As substituted alkyl, $R^1$ can be for example: 2-chloroethyl, 2-hydroxybutyl, 2-butoxyethyl or 3-chloro-2-hydroxypropyl. The substituents $R^1$ to $R^5$ as phenylalkyl can be for example: benzyl, 1- or 2-phenylethyl or 1-phenylisopropyl. As cycloalkyl, $R^1$ can be for example: cyclopentyl, cyclohexyl, methyl-cyclohexyl or cyclooctyl. $R^1$ as alkenyl can be for example: vinyl, propenyl, allyl, methallyl, butenyl or octenyl.

As aryl or substituted aryl, $R^6$ can be for example: phenyl, o-tolyl, 2,4-dimethylphenyl, 2,4,6-trimethylphenyl, 2,4,6-triisopropylphenyl, 4-tert-butylphenyl, 4-octylphenyl, 4-dodecylphenyl, 3-methoxyphenyl, 4-ethoxyphenyl, 4-acetamidophenyl, 4-chlorophenyl, 3-chloro-4-methylphenyl, 1- or 2-naphthyl, 4-octyl-1-naphthyl or 6-chloro-1-naphthyl. $R^6$ can also be a mixture of groups defined for $R^6$, for example with the use of a commercial sulfonic acid. There are known commercial mixtures of alkylated benzene- or naphthalene-sulfonic acids, which can consist of position-isomeric individual components or of individual components of varying degrees of alkylation, or of individual components having different alkyl groups.

The compounds of the formula I are quaternary quinolinium salts which can be produced, using methods known per se, by reaction of a quinoline base with a sulfonic acid ester of the formula $R^6$-$SO_3R^1$. An excess bly used in this case, er is prefera and the reaction is performed in an organic solvent in which the salt is difficultly soluble, so that it is obtained as a crystalline product, as is described in a general manner by C. S. Marvel et al. in J. Am. Chem. Soc. 51, (1929), 3638-41. It is also possible however to use a solvent or solvent mixture in which the formed salt is soluble, and to employ the resulting solution directly as an additive to the lacquer.

Compounds of the formula I which are preferred by virtue of their availability are those wherein $R^1$ is $C_1$-$C_4$-alkyl, $R^2$ and $R^4$ independently of one another are each hydrogen, $C_1$-$C_4$-alkyl, halogen, -COOCH$_3$, -OCH$_3$, -CN or -CHO, $R^3$ and $R^5$ are hydrogen, and $R^6$ is $C_6$-$C_{10}$-aryl which is unsubstituted or substituted by $C_1$-$C_4$-alkyl or halogen, or it is $CF_3$.

Examples of individual compounds of the formula I are:
1-methyl-quinolinium-p-toluenesulfonate,
1-methyl-quinolinium-benzenesulfonate,
1-methyl-quinolinium-naphthalene-1-sulfonate,
1-methyl-quinolinium-methanesulfonate,
1-ethyl-quinolinium-p-toluenesulfonate,
1-propyl-quinolinium-benzenesulfonate,
1-butyl-quinolinium-p-toluenesulfonate,
1,2-dimethyl-quinolinium-p-chlorobenzenesulfonate,
1,4-dimethyl-quinolinium-p-tert-butylbenzenesulfonate,
1,6-dimethyl-quinolinium-p-toluenesulfonate,
1,8-dimethyl-quinolinium-naphthalene-1-sulfonate,
1,2,4-trimethyl-quinolinium-p-toluenesulfonate,
6-methoxy-1-methyl-quinolinium-p-dodecylbenzenesulfonate,
4-methoxy-1-methyl-quinolinium-2,4-dimethylbenzenesulfonate,
3-bromo-1-methyl-quinolinium-mesitylenesulfonate,
8-hydroxy-1-methyl-quinolinium-benzenesulfonate,
1-methyl-2-phenyl-quinolinium-trifluoromethanesulfonate,
5,8-dichloro-1-methyl-quinolinium-naphthalene-2-sulfonate,
1,2-dimethyl-quinolinium-mesitylenesulfonate,
1-methyl-4-carbomethoxy-quinolinium-p-toluenesulfonate,
1-methyl-3-cyano-quinolinium-trifluoromethanesulfonate, and
1-methyl-3-formyl-quinolinium-benzenesulfonate.

The compounds of the formula I are added to the stoving lacquers in an amount suffient for curing. The amount required depends not only on the nature of the lacquer resin but also on the stoving temperature and stoving time. In general there is added 0.1 to 10% by weight, preferably 0.5 to 3% by weight, relative to the solvent-free lacquer resin.

Suitable stoving lacquers are all those of which the curing can be accelerated by acid catalysts. They are in particular lacquers based on acrylic, polyester, alkyd, melamine, urea and phenolic resins, especially however on the mixtures of acrylic, polyester or alkyd resins with one another or with a melamine resin. These also include modified lacquer resins, for example acrylic-modified polyester or alkyd resins. Examples of individual types of resins embraced by the term 'acrylic, polyester and alkyd resins' are described, for example, in Wagner, Sarx/Lackkunstharze (Synthetic Lacquer Resins) (Munich, 1971) on pages 86-123 and 229-238, or in Ullmann/Encyclopädie der techn. Chemie (Encyclopaedia of Industrial Chemistry), 4th Edition, Volume 15 (1978), pages 613-628. Acid catalysis is of particular importance for the curing of lacquers which contain etherified melamine resins, for example methylated or butylated melamine resins (N-methoxymethyl- and N-butoxymethyl-melamines).

There are used for specific purposes also stoving lacquers which have monomeric or oligomeric constituents containing unsaturated groups capable of polymerisation. These lacquers too are curable by the process according to the invention when additionally radical polymerisation initiators or photoinitiators are concomitantly used. The former initiate polymerisation of the unsaturated groups during the heat treatment, the latter during UV irradiation. Such lacquers having unsaturated components can be polymerised also by electron rays. Additionally to polymerisation of the unsaturated components, however, there always has to occur an acid-catalysed crosslinking (during stoving).

The lacquers can be solutions or dispersions of the lacquer resin in an organic solvent or in water; they can however also be solvent-free. Lacquers having a low proportion of solvent, so-called "high solids lacquers", are of particular interest. The lacquers can be clear lacquers, such as are used, for example, in the automobile industry as top-coat lacquers of multilayer coatings. They can also contain pigments, whether they be inorganic or organic pigments, and also metal pigments for metal-effect lacquers.

The lacquers can also contain smallish amounts of special additives, such as are commonly used in lacquer technology, for example levelling agents, thixotropic agents agents, light stabilisers or antioxidants. Examples of light stabilisers are those from the class comprising hydroxyphenyl-benzotriazoles, hydroxybenzophenones, cyanoacrylates, hydroxyphenyl-triazines, oxalanilides, organic nickel compounds or polyalkylpiperidine derivatives. Since light stabilisers of the UV-absorber type can interfere with the UV irradiation according to the invention, such light stabilisers can also be incorporated into an adjacent lacquer layer, from which they can then gradually diffuse into the protecting layer of the stoving lacquer. The adjacent lacquer layer can be a primer coating under the stoving lacquer, or it can be a top-coat lacquer over the stoving lacquer.

The lacquers are applied to the substrates to be coated by the customary methods of industrial lacquering, for example by brushing, spraying, dipping or roll coating.

The irradiation of the lacquer with shortwave light can be carried out either immediately before application of the lacquer or afterwards. The light preferably used is UV light, for which there are at the present time a number of suitable technical devices. These incorporate medium-pressure, high-pressure or low-pressure mercury vapour lamps, the emission maxima of which is at 250 to 400 nm. The irradiation times required depend on the layer thickness of the lacquer, on the pigmentation, on the light intensity of the lamps and on the distance the lamps are away from the lacquer. An unpigmented lacquer in a customary layer thickness requires a few seconds exposure time in the usual UV irradiation apparatus. The latent catalyst during this time becomes photochemically converted with the formation of free sulfonic acid.

When photosensitisers are added to the lacquers, the irradiation can be performed with fluorescent tubes or with daylight lamps. Examples of known photosensitisers are condensed aromatic compounds, for example perylene, aromatic amines (such as are described for example in the U.S. Patent Specification No. 4,069,054), or cationic and basic dyes (as described for example in U.S. patent Specification No. 4,026,705).

Since acid curing at room temperature proceeds very slowly, it is necessary in the practical carrying-out of the process for irradiation to be followed by stove-curing. Unlike the processes with thermally cleavable curing catalysts, stove curing in this process can be performed at relatively low temperatures. With a stoving time of about 30 minutes and with the use of about 2% of catalyst, stoving temperatures of 70° to 80° C. are sufficient. When 1% of catalyst is used, temperatures of 80° to 100° C. are required, and with 0.5% of catalyst, temperatures of about 100° to 120° C. Compared with these, however, the necessary stoving temperatures for curing with known amine salts of sulfonic acids (without irradiation) are above 120° C.

The process according to the invention is suitable for all types of industrial lacquer coating, for example for the lacquer coating of machines, vehicles, ships or structural parts. It is of particular importance for vehicle paintwork. In this case, it can be used either in one-coat paintwork or in multicoat paintwork. The application of the process for the continuous coating of sheet metal, for example sheet steel or aluminium sheet, i.e. the so-called coil-coat process, is also of particular interest.

The invention relates also to the stoving lacquers containing a latent curing catalyst of the formula I. Compared with known lacquers which contain amine salts of sulfonic acids as latent curing catalysts, the lacquers catalysed according to the invention have the advantage of the higher storage stability in the dark. With the exclusion of light, the lacquers according to the invention are storage-stable for years at room temperature; and even at temperatures of 40° to 50° C., the lacquers remain stable over a period of months.

The following Examples illustrate the invention by the use of compositions typical for stoving lacquers. The term 'parts' denotes parts by weight, and percentages (%) are percent by weight.

EXAMPLE 1

Curing of a lacquer based on acrylic/melamine resin

Aluminium sheets, 0.5 mm thick and coated with a white-pigmented primer lacquer based on polyester resin were coated with a high-solids clear lacquer of the following composition:
53.7 parts of acrylic resin (Paraloid ®OL 42, Rohm and Haas Co., U.S.A.),
19.3 parts of melamine resin (Cymel ® 301, Amer. Cyanamide Co.),
1.9 parts of cellulose acetobutyrate (CAB 551, Eastman Chem. Co.)
10.6 parts of n-butanol,
10.5 parts of butylacetate,
3.0 parts of a levelling agent (Byketol Spezial ®, Byk-Mallinckrodt),
0.4 part of a levelling agent (Modaflow ®, Monsanto Comp.), and
0.6 part of a curing catalyst.

The catalyst was preliminarily dissolved in a portion of the butanol. The lacquer had a content of 62.1% of solids (binder). The amount of catalyst corresponded therefore to 1%, relative to the solvent-free binder.

The lacquer was applied with an electric film spreader to give a dry-film thickness of about 30 μm. After an airing time of 15 minutes, the specimens were exposed, in a PPG irradiation apparatus provided with 2 high-pressure mercury vapour lamps each of 80 watt, to UV irradiation, the irradiation times being varied during the test. The specimens were subsequently stoved for 30 minutes in a lacquer stove at 100° C.

An assessment of the degree of curing was made by determining the pendulum hardness of the lacquer film by the König method (DIN 53 157). The results are given in Table 1.

TABLE 1

| Employed curing catalyst | Irradiation time (sec) | Pendulum hardness (sec) |
|---|---|---|
| 1,2-dimethyl-quinolinium-p-toluene-sulfonate | 0 | not measureable |
|  | 2.1 | 55 |
|  | 4.2 | 73 |
|  | 12.6 | 77 |
|  | 25.2 | 64 |
| 1-methyl-quinolinium-p-toluene-sulfonate | 0 | not measureable |
|  | 2.1 | 97 |
|  | 4.2 | 103 |
|  | 12.6 | 102 |
|  | 25.2 | 106 |

In order to assess the storage stability, the lacquers containing the catalyst were stored at 60° C. in the dark in closed glass containers for 3 days, and their viscosity was measured continually with an ICI cone-and-plate viscosimeter. The results are shown in Table 2.

TABLE 2

| Employed curing catalyst | Viscosity (in poise) on storage at 60° C. after | | | | |
|---|---|---|---|---|---|
|  | 0 | 1 | 2 | 3 | days |
| 1,2-dimethyl-quinolinium-p-toluenesulfonate | 1.4 | 1.9 | 2.8 | 3.5 | |
| 1-methylquinolinium-p-toluenesulfonate | 1.5 | 2.3 | 2.8 | 2.8 | |

EXAMPLE 2

Lacquer specimens were prepared in the manner described in Example 1; they were then applied to aluminium sheet, irradiated and subsequently stove-cured; the concentration of the catalyst and the stoving temperature were however varied. The irradiation time was 4.2 seconds.

TABLE 3

| Employed curing catalyst | Amount of catalyst (relative to solids) | Pendulum hardness (sec) after 30 min. curing at | | |
|---|---|---|---|---|
|  |  | 80° C. | 100° C. | 120° C. |
| 1-methyl-quinolinium-p-toluenesulfonate | 0.5% | — | 38 | 96 |
|  | 1% | 23 | 96 | 130 |
|  | 1.5% | 58 | 111 | 143 |
|  | 2% | 80 | 130 | 144 |
|  | 3% | 98 | — | — |

As is shown in Table 3, the lower the stoving temperature, the greater is the amount of catalyst required. A lengthening of the irradiation time effects no substantial acceleration of curing. The irradiation time can however in most cases be reduced to 2 seconds without noticeable decrease in the pendulum hardness.

EXAMPLE 3

With use of the same procedure as described in Example 1, a further number of quinolinium salts were tested with respect to their suitability as curing catalysts and to the storage stability of the catalysed lacquer specimens. The lacquer recipe used was the same as in Example 1

The results are summarised in Table 4.

TABLE 4

| Employed curing catalyst (1%) | Irradiation time (sec) | Pendulum hardness (sec) | Storage stability (viscosity increase in poise) on storage at 60°, C. after | | | | | |
|---|---|---|---|---|---|---|---|---|
| | | | 0 | 1 | 2 | 3 | 4 | 8 days |
| 1-methyl-3-carboxy-methoxy-quinolinium-p-toluene-sulfonate | 0 | not measurable | 0 | 0,6 | 0,4 | 0,5 | 0,6 | 0,4 |
| | 2,1 | 43 | | | | | | |
| | 4,2 | 56 | | | | | | |
| | 12,6 | 64 | | | | | | |
| | 25,2 | 64 | | | | | | |
| 1-methyl-3-cyano-quinolinium-p-toluene-sulfonate | 0 | not measurable | 0 | 0,8 | 0,8 | 0,7 | 0,4 | 0,4 |
| | 2,1 | 62 | | | | | | |
| | 4,2 | 71 | | | | | | |
| | 12,6 | 74 | | | | | | |
| | 25,2 | 67 | | | | | | |
| 1,8-dimethyl-quinolinium-p-toulene-sulfonate | 0 | 12 | 0 | 0,4 | 0,4 | 0,2 | 0,3 | 0 |
| | 2,1 | 17 | | | | | | |
| | 4,2 | 21 | | | | | | |
| | 12,6 | 29 | | | | | | |
| | 25,2 | 36 | | | | | | |
| 1-methyl-quinolinium-trifluoro-methane-sulfonate | 0 | not measurable | 0 | 0,8 | 0,6 | 0,6 | 0,2 | 0,3 |
| | 2,1 | 27 | | | | | | |
| | 4,2 | 44 | | | | | | |
| | 12,6 | 53 | | | | | | |
| | 25.2 | 48 | | | | | | |
| 1-methyl-4-carboxymethoxy-quinolinium-p-toluene-sulfonate | 0 | not measurable | 0 | 0,3 | 0,4 | 0,4 | 0,4 | 0,3 |
| | 2,1 | 35 | | | | | | |
| | 4,2 | 52 | | | | | | |
| | 12,6 | 70 | | | | | | |
| | 25,2 | 71 | | | | | | |
| 1,6-dimethyl-quinolinium-p-toluene-sulfonate | 0 | not measurable | 0 | 0,1 | 0,1 | 0,2 | 0,3 | −0,5 |
| | 2,1 | 43 | | | | | | |
| | 4,2 | 60 | | | | | | |
| | 12,6 | 67 | | | | | | |
| | 25,2 | 68 | | | | | | |
| 1-methyl-3-bromo-quinolinium-p-toluene-sulfonate | 0 | not measurable | 0 | 0,2 | 0,1 | 0,4 | 0,2 | 0 |
| | 2,1 | 20 | | | | | | |
| | 4,2 | 38 | | | | | | |
| | 12,6 | 66 | | | | | | |
| | 25.2 | 79 | | | | | | |
| 1-methyl-3-formyl-quinolinium-p-toluene-sulfonate | 0 | not measurable | 0,1 | 0,4 | 0,5 | 0,6 | 0,6 | 0,3 |
| | 2,1 | 42 | | | | | | |
| | 4,2 | 54 | | | | | | |
| | 12,6 | 60 | | | | | | |
| | 25,2 | 57 | | | | | | |
| 1-methyl-6-methoxy-quinolinium-p-toluene-sulfonate | 0 | not measurable | 0,1 | −0,1 | −0,1 | 0,1 | 0 | 0 |
| | 2,1 | 20 | | | | | | |
| | 4,2 | 46 | | | | | | |
| | 12,6 | 71 | | | | | | |
| | 25,2 | 73 | | | | | | |
| 1-methyl-quinolinium-2,4,6-trimethyl-benzene-sulfonate | 0 | not measurable | 0,2 | −0,1 | 0 | 0,2 | 0,2 | 0 |
| | 2,1 | 62 | | | | | | |
| | 4,2 | 76 | | | | | | |
| | 12,6 | 78 | | | | | | |
| | 25,2 | 75 | | | | | | |
| 1-methyl-quinolinium-naphthalene-2-sulfonate | 0 | not measurable | 0,2 | 0 | 0 | 0,2 | 0,1 | 0,4 |
| | 2,1 | 35 | | | | | | |
| | 4,2 | 55 | | | | | | |
| | 12,6 | 67 | | | | | | |
| | 25,2 | 67 | | | | | | |
| 1-methyl-quinolinium-benzene-sulfonate | 0 | not measurable | 0,1 | 0,1 | 0 | 0,2 | 0,4 | 0,2 |
| | 2,1 | 70 | | | | | | |
| | 4,2 | 83 | | | | | | |
| | 12,6 | 87 | | | | | | |
| | 25,2 | 85 | | | | | | |
| 1-butyl-quinolinium- | 0 | not measurable | 0,2 | 0,1 | 0,1 | 0,2 | 0,3 | −0,1 |

TABLE 4-continued

| Employed curing catalyst (1%) | Irradiation time (sec) | Pendulum hardness (sec) | Storage stability (viscosity increase in poise) on storage at 60°, C. after | | | | | |
|---|---|---|---|---|---|---|---|---|
| | | | 0 | 1 | 2 | 3 | 4 | 8 days |
| -p-toluene-sulfonate | 2,1 | 65 | | | | | | |
| | 4,2 | 78 | | | | | | |
| | 12,6 | 77 | | | | | | |
| | 25,2 | 75 | | | | | | |

What is claimed is:

1. A process for curing an acid-catlyzable stoving lacquer which comprises incorporating 0.1 to 10%, by weight of lacquer solids, of a latent curing catalyst into said lacquer, said catalyst comprising a quinolinium sulfonate of the formula I

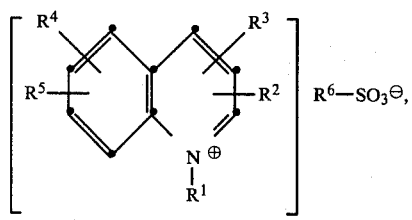

wherein $R^1$ is $C_1$-$C_8$-alkyl, $C_1$-$C_4$-alkyl substituted by halogen, hydroxyl or $C_1$-$C_4$-alkoxy, or it is $C_2$-$C_8$-alkenyl, $C_7$-$C_9$-phenylalkyl or $C_5$-$C_8$-cycloalkyl, $R^2$, $R^3$, $R^4$ and $R^5$ independently of one another are each hydrogen, $C_1$-$C_4$-alkyl, halogen, -CN, -COO($C_1$-$C_4$-alkyl), -CHO, hydroxyl, $C_1$-$C_4$-alkoxy, an acyloxy group $R^7$COO-, a group $R^8$-CH=CH-, $C_7$-$C_9$-phenylalkyl or phenyl, $R^6$ is $C_1$-$C_{12}$-alkyl, $C_6$-$C_{10}$-aryl which is unsubstituted or mono- or polysubstituted by $C_1$-$C_{12}$-alkyl, $C_1$-$C_4$-alkoxy, halogen or a group $R^7$CONH-, or it is fluorine, $NH_2$ or $CF_3$, and $R^7$ and $R^8$ independently of one another are each $C_1$-$C_4$-alkyl or phenyl; irradiating said catalyst-containing lacquer with shortwave light; and heating said irradiated lacquer.

2. A process according to claim 1, wherein the curing catalyst is a compound of the formula I in which $R^1$ is $C_1$-$C_4$-alkyl, $R^2$ and $R^4$ independently of one another are each hydrogen, $C_1$-$C_4$-alkyl, halogen, -COOCH$_3$, -OCH$_3$, -CN or -CHO, $R^3$ and $R^5$ are each hydrogen, and $R^6$ is $C_6$-$C_{10}$-aryl which is unsubstituted or substituted by $C_1$-$C_4$-alkyl or halogen, or it is $CF_3$.

3. A process according to claim 1, wherein the curing catalyst is 1-methylquinolinium-p-toluenesulfonate.

4. A process according to claim 1, wherein the lacquer is irradiated with UV light before being heated.

5. A process according to claim 1, wherein the irradiated lacquer is cured at temperatures of 70° to 120° C.

6. A lacquer based on acid-curable lacquer resins, which lacquer is curable by irradiation with shortwave light and subsequent heating, and which comprises said lacquer resins and 0.1 to 10% by weight, based on solvent-free lacquer resin, of a latent curing catalyst of the formula I of claim 1.

7. A lacquer according to claim 6, which contains 0.5 to 3% by weight, of curing catalyst, relative to the solvent-free lacquer resin.

8. A lacquer according to claim 6, which contains, in addition to the latent curing catalyst, a pigment or some other additive customarily used in lacquer technology.

9. A lacquer according to claim 6, which contains, in addition to the latent curing catalyst, a sensitiser.

* * * * *